(12) United States Patent
Nayak (10) Patent No.: US 8,984,486 B2
(45) Date of Patent: Mar. 17, 2015

(54) SYSTEM, METHOD, AND COMPUTER PROGRAM PRODUCT FOR AUTOMATED STABILITY TESTING OF DEVICE FIRMWARE

(71) Applicant: NVIDIA Corporation, Santa Clara, CA (US)

(72) Inventor: Shiva Prasad Nayak, Baripada (IN)

(73) Assignee: NVIDIA Corporation, Santa Clara, CA (US)

( * ) Notice: Subject to any disclaimer, the term of this patent is extended or adjusted under 35 U.S.C. 154(b) by 56 days.

(21) Appl. No.: 13/940,916

(22) Filed: Jul. 12, 2013

(65) Prior Publication Data

US 2015/0020055 A1     Jan. 15, 2015

(51) Int. Cl.
    *G06F 9/44*     (2006.01)
    *G06F 11/36*     (2006.01)

(52) U.S. Cl.
    CPC .......... *G06F 11/368* (2013.01); *G06F 11/3664* (2013.01)
    USPC ....................................................... 717/124

(58) Field of Classification Search
    CPC ............ G06F 11/3688; G06F 11/3664; G06F 11/3684
    USPC ................................................. 717/124–126
    See application file for complete search history.

(56) References Cited

U.S. PATENT DOCUMENTS

| | | | | |
|---|---|---|---|---|
| 5,831,996 | A * | 11/1998 | Abramovici et al. | 714/738 |
| 2009/0106419 | A1* | 4/2009 | Tierney et al. | 709/224 |
| 2010/0047760 | A1* | 2/2010 | Best et al. | 434/362 |
| 2011/0161912 | A1* | 6/2011 | Eteminan et al. | 717/101 |
| 2012/0084759 | A1* | 4/2012 | Candea et al. | 717/126 |
| 2014/0130031 | A1* | 5/2014 | Exton et al. | 717/171 |

* cited by examiner

*Primary Examiner* — Anna Deng
(74) *Attorney, Agent, or Firm* — Zilka-Kotab, PC (57) ABSTRACT

A method, system, and computer-program product are provided for automatically performing stability testing on device firmware. The method includes the steps of copying a binary file corresponding to a version of a firmware to one or more nodes that each include a testbench, causing the one or more nodes to perform tests utilizing the version of the firmware, and determining whether a new build of the firmware is available. If the new build is available, then the steps include copying a second binary file corresponding to the new build to the one or more nodes and causing the one or more nodes to perform the tests utilizing the new build. However, if the new build is not available, then the steps include then causing the one or more nodes to perform one or more further iterations of the tests utilizing the version of the firmware.

17 Claims, 7 Drawing Sheets

SYSTEM, METHOD, AND COMPUTER PROGRAM PRODUCT FOR AUTOMATED STABILITY TESTING OF DEVICE FIRMWARE

FIELD OF THE INVENTION

The present invention relates to device testing, and more particularly to the automation of firmware test protocols.

BACKGROUND

Device manufacturers develop and test new designs on a regular basis. For example, a manufacturer may develop a new chip or integrated circuit every year or two. In addition to hardware changes, developers may develop new firmware (i.e., the software that manages the device) on an ongoing basis, providing the device with new capabilities and working to fix any bugs discovered in previous versions of the firmware. As new hardware is developed or new versions of the associated firmware are developed, the designers typically attempt to develop plans to test the new hardware or firmware before releasing the product to consumers. The test plans are developed to ensure that any changes to the device or firmware have been implemented according to a specification developed prior to the design to ensure that the device works as intended and that the changes to the firmware and/or hardware have not introduced any new issues.

Sometimes these design changes may introduce new hugs to the device. These bugs may be difficult to detect, requiring specific conditions to be present in order for the bug to be detected. Other times, the bugs may be intermittent, such as the result of noise from electro-magnetic interference (EMI). Typically, designers develop test protocols to attempt to discover and fix bugs, but the test protocols cannot reproduce every single condition a device may encounter and, therefore, test protocols are limited in terms of which bugs can be discovered. Test plans are typically run for a set number of iterations using a set number of conditions before the device and/or firmware is validated and certified to be released. However, when the device is released, some of the bugs may not have been discovered due to the limited nature of the tests performed. Thus, there is a need for addressing this issue and/or other issues associated with the prior art.

SUMMARY

A method, system, and computer-program product are provided for automatically performing stability testing on device firmware. The method includes the steps of copying a binary file corresponding to a version of a firmware to one or more nodes that each include a testbench, causing the one or more nodes to perform tests utilizing the version of the firmware, and determining whether a new build of the firmware is available. If the new build is available, then the steps include copying a second binary file corresponding to the new build to the one or more nodes and causing the one or more nodes to perform the tests utilizing the new build. However, if the new build is not available, then the steps include then causing the one or more nodes to perform one or more further iterations of the tests utilizing the version of the firmware.

DETAILED DESCRIPTION

The present disclosure describes a system that automates the execution of a test plan based on the presence of a new design. A manufacturer may setup one or more nodes, where each node is connected to a separate hardware testbench. Each node is configured to load a binary file corresponding to a version of firmware onto the testbench and perform a series of tests on the testbench utilizing the version of the firmware. The results of the tests are transmitted to a master node and utilized to generate a visual representation of the results for display to a designer. The series of tests are rerun automatically until the designer changes the test protocol specifying the series of tests or a new build for another version of the firmware is made available.

The system performs the test protocol automatically based on the presence of a new build. In other words, once a designer has compiled a source code for a new version of the firmware and made the binary file available (e.g., created a record of the new version in a database, stored the binary file in a specific folder on able system, etc.), the master node will locate the binary file, automatically copy the binary file to each of the nodes, and run tests specified by the test protocol on the testbenches loaded with the new version of the firmware. All of this activity is performed without the designer's intervention once the file is made available. Furthermore, the test protocol is run continuously while no other version of the firmware is made available. In other words, the number of iterations of the tests specified in the test protocol is based on the availability of a new version of the firmware. By not bounding the number of iterations for the tests, the stability of different builds may be greater than if the designers specified a set number of iterations to run during a time period or merely set the tests to run for a specified period. Furthermore, designers may view the results of the tests as they are generated, and, if new bugs are discovered, the designers can take appropriate action to fix the bugs and make a new build available for testing. However, if bugs aren't discovered, then the designers can allow the tests to continue running, or change the configuration of the tests being run, to improve the duration of testing and ensure better, more stable firmware when compared to prior art techniques.

Figure 1:
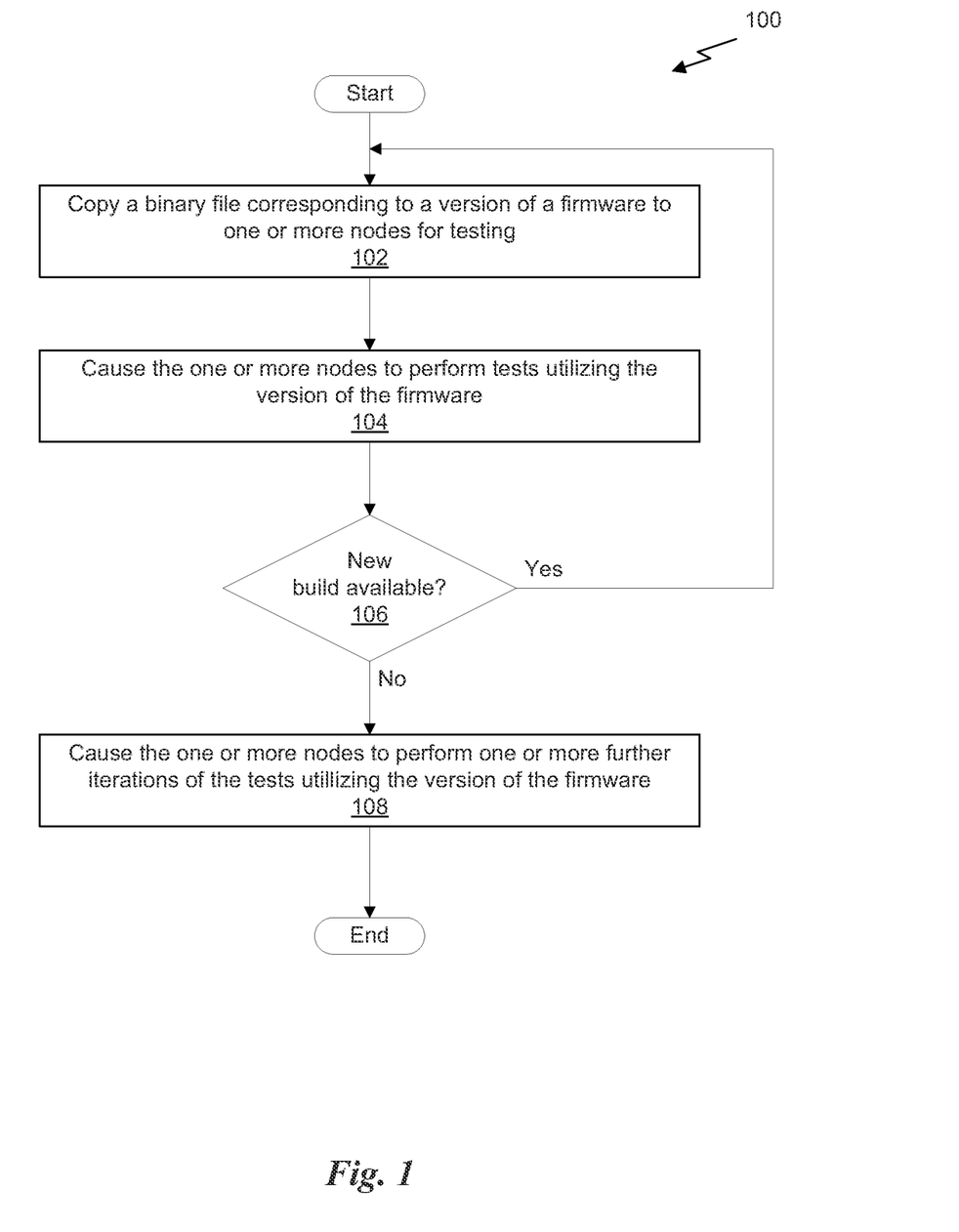
FIG. 1 illustrates a flowchart of a method for automated stability testing of device firmware, in accordance with one embodiment.

FIG. 1 illustrates a flowchart of a method 100 for automated stability testing of device firmware, in accordance with one embodiment. At step 102, a binary file corresponding to a version of firmware for the device is copied to one or more nodes for testing. In the context of the present disclosure, firmware refers to software configured to manage operation of an electronic device (i.e., hardware). The term firmware may encompass a plurality of different, related versions of software configured to manage the operation of the electronic device as bugs are discovered and removed via coding changes. The plurality of different versions of firmware for a particular electronic device are referred to herein as versions of the firmware. A node comprises a machine (e.g., a computer, dedicated hardware controller, etc.) coupled to a testbench. In one embodiment, the machine may be a computer capable of storing a binary file corresponding to a version of the firmware in a memory or storage device, loading the binary file onto the testbench hardware, and causing the testbench to perform one or more tests to ensure the stability of the version of the firmware. The testbench may be any subset of hardware included in the target electronic device. For example, the testbench may include a processor and a memory for testing various applications executed by the processor. An alternative testbench may include a processor, a memory, and one or more other components such as a digital image sensor or a flash memory device. In one embodiment, a master node is configured to copy the binary file corresponding to the version of the firmware from a location on a network to a corresponding local memory associated with each of the nodes. At step 104, the one or more nodes perform tests utilizing the version of the firmware. In one embodiment, the master node is configured to transmit instructions to the nodes that cause the nodes to perform the tests. The tests may comprise an application program configured to be executed by the testbench to generate results.

At step 106, a determination is made as to whether a new build corresponding to a new version of the firmware is available. In one embodiment, the master node queries a database to determine whether designers have generated a new build for testing since the build currently being tested was generated. In another embodiment, the master node checks a location in a file system to determine whether a new build is available. If a new build is available, then the method 100 returns to step 102 where a binary file corresponding to the new build is copied to the one or more nodes and each of the nodes perform the tests utilizing the new build. However, returning to step 106, if a new build is not available, then, at step 108, the one or more nodes perform one or more further iterations of the tests on the current build being tested.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
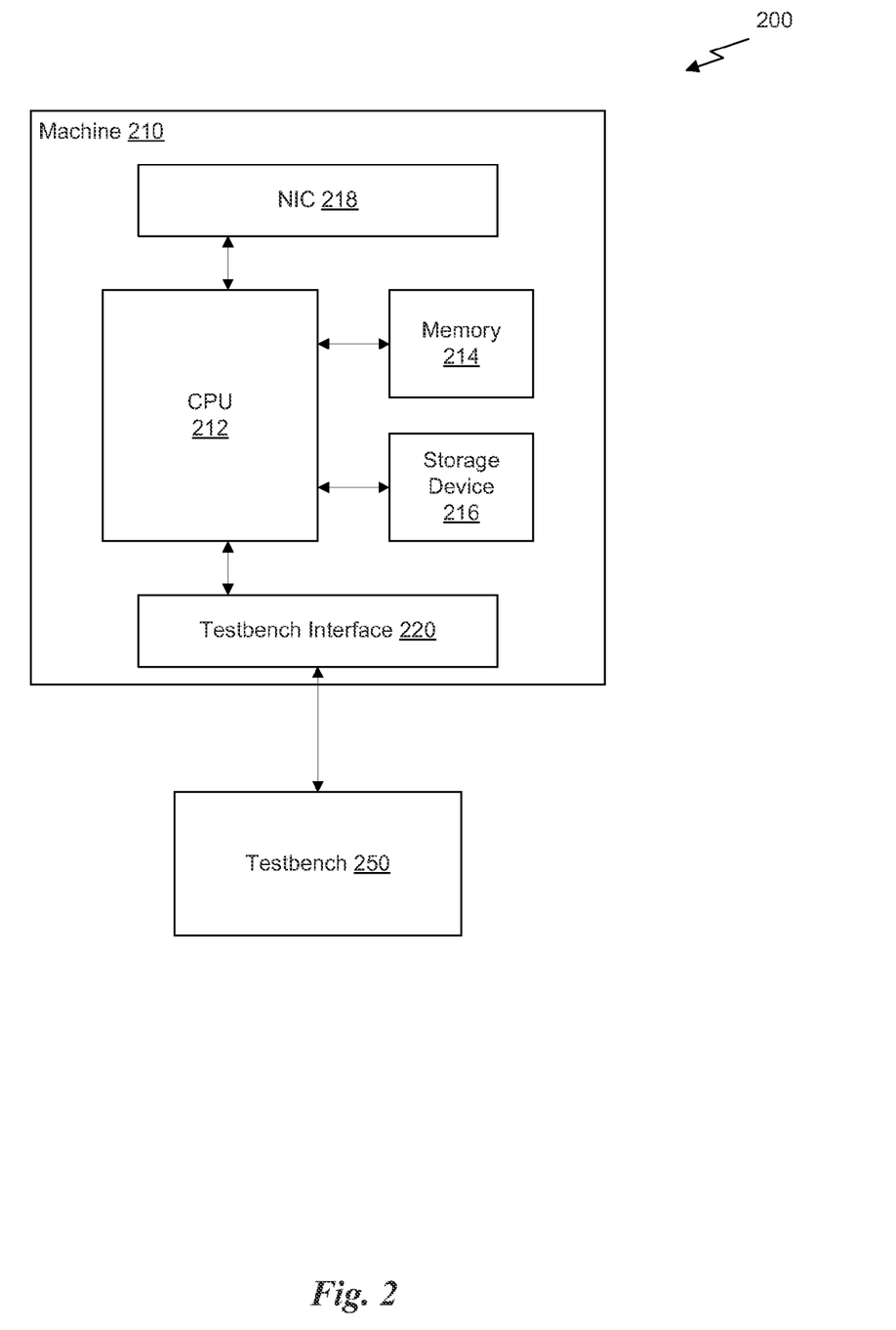
FIG. 2 illustrates a node for testing versions of the firmware on a testbench, in accordance with one embodiment.

FIG. 2 illustrates a node 200 for testing versions of the firmware on a testbench 250, in accordance with one embodiment. As shown in FIG. 2, the node 200 includes a machine 210 connected to a testbench 250 via a testbench interface 220. In one embodiment, the machine 210 is a computer such as a desktop computer, laptop computer, or rack workstation. The machine 210 includes a central processing unit (CPU) 212, a memory 214, a storage device 216, and a network interface controller (NIC) 218. The storage device 216 may be a magnetic hard disk drive, a solid state device, a flash memory device, or some other type of non-volatile storage. In one embodiment, the storage device 216 is located on a network connected to the machine 210 via the NIC 218. The storage device 216 may be, e.g., a cloud-based storage service such as Amazon® S3. The memory 214 may be a dynamic random access memory (DRAM) device or some other type of volatile storage that temporarily stores applications and data for execution on the CPU 212. The NIC 218 may be any type of wired or wireless network controller conforming to, e.g., the IEEE (Institute of Electrical and Electronics Engineers) 802 standards for local area networks, such as IEEE 802.3 (Ethernet frame data), IEEE 802.11 (Wireless LAN), or other wired and wireless networking standards. In one embodiment, the machine 210 communicates with other nodes 200 via a local area network, the Internet (i.e., using a dedicated IP address), or some other communications network coupled to the NIC 218.

The machine 210 may be configured to load versions of firmware stored in the storage device 216 and/or the memory 214 onto the testbench 250. In one embodiment, the testbench 250 includes at least a subset of the hardware included in an electronic device represented by the testbench 250. For example, for a testbench 250 that represents a mobile phone, the testbench 250 may include a system-on-chip (SoC) that includes one or more processing cores, one or more graphics processing cores, one or more digital signal processors, a display driver, hardware-accelerated audio and video codecs, a global positioning system (GPS) controller, a digital camera controller, a universal serial bus (USB) controller, a power management controller, a radio (e.g., for Bluetooth and/or WiFi communications as well as for cellular broadband communications), and zero or more other components located in a single integrated circuit package. While the finished electronic device may package the SoC in a case along with, e.g., a digital CMOS (Complementary Metal Oxide Semiconductor) image sensor and lens assembly, a microphone, speakers, an liquid crystal display (LCD), a battery, and a flash memory device or solid state drive, the testbench 250 may only include a subset of these components connected to the SoC, where the subset of components may be determined based on the types of tests to be performed by the testbench 250. For example, a testbench 250 performing a test requiring the capture and storage of digital images in a memory may include the image sensor and lens assembly coupled to the SoC as well as the flash memory device or solid state drive. However, the testbench 250 may not require the use of the speakers, the microphone, or the LCD display and such components may be omitted from the testbench 250. In the context of the present disclosure, the testbench 250 is any set of hardware and software capable of executing firmware or software for testing a least a portion of the functionality of the electronic device.

Figure 3:
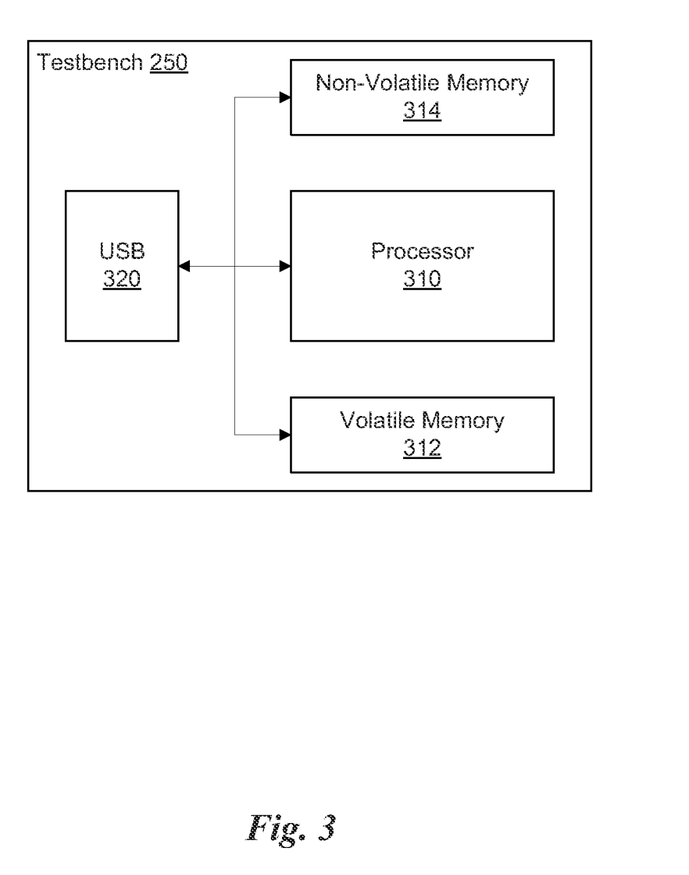
FIG. 3 illustrates the testbench of FIG. 2, in accordance with one embodiment.

FIG. 3 illustrates the testbench 250 of FIG. 2, in accordance with one embodiment. As shown in FIG. 3, the testbench 250 includes a processor 310 (such as the SoC described above or, e.g., an ARM processor or microcontroller) as well as a non-volatile memory 314 for storing the firmware. The non-volatile memory 314 may be, e.g., an EEPROM (Electrically Erasable Programmable Read-Only Memory) or other flash memory device. The machine 210 is configured to load versions of the firmware into the non-volatile memory 314. one embodiment, the machine 210 flashes the firmware to an EEPROM device. The processor 310, on power-up, is configured to load the firmware from the non-volatile memory 314 device into a volatile memory 312 (e.g., SDRAM) for execution of the tests. The tests may be controlled by software executing locally on the testbench 250 or may be controlled remotely via commands transmitted from the machine 210 to the testbench 250.

The testbench 250 may also include an interface for communications with the machine 210. In one embodiment, the testbench 250 may include a USB interface 320 for establishing communications with the machine 210 and for receiving the firmware to be flashed to the non-volatile memory 314. In other embodiments, the USB interface 320 may be replaced with other types of interfaces for communicating with the machine 210 and/or other components of the testbench 250. It will be appreciated that the testbench 250 shown in FIG. 3 is only one possible hardware setup and that other types and configurations of the testbench 250 are contemplated as being within the scope of the present disclosure. For example, even for the same electronic device, a first testbench 250 may be configured as shown in FIG. 3 while a second testbench 250 may include additional components such as a CMOS image sensor for running different tests. In addition, another testbench 250 that represents a different electronic device may include different hardware, such as a CPU (Central Processing Unit), a GPU (Graphics Processing Unit), a memory, and a JTAG (Joint Test Action Group) port. Yet another testbench 250 may comprise a graphics processing unit as a portion of a graphics card (i.e., a printed circuit board including a GPU, a local graphics memory such as SDRAM, a voltage regulator, and a communications interface such as a peripheral components interconnect express (PCIe) connector).

Figure 4:
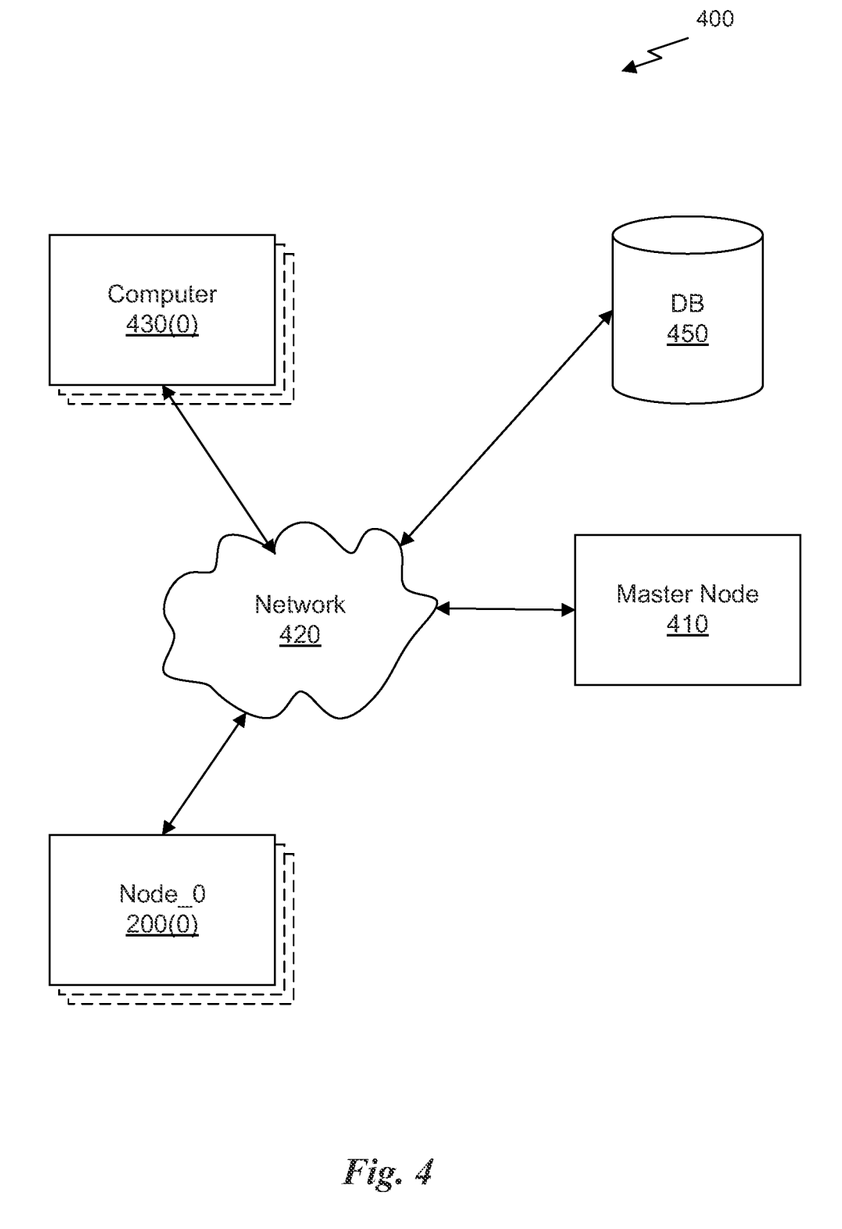
FIG. 4 illustrates a system for implementing an automatic testing protocol for various versions of the firmware configured to be executed by the testbench, in accordance with one embodiment.

FIG. 4 illustrates a system 400 for implementing an automatic testing protocol for various versions of the firmware configured to be executed by the testbench 250, in accordance with one embodiment. As shown in FIG. 4, the system 400 includes a master node 410 and one or more other nodes (i.e., 200(0), 200(1), etc.) for performing various tests on one or more corresponding testbenches (i.e., 250(0), 250(1), etc.). In one embodiment, the master node 410 is a separate and distinct computer that does not include a testbench 250. In another embodiment, one of the nodes 200 connected to a testbench 250 and configured to perform tests utilizing the testbench 250 is configured as the master node 410. The master node 410, and each of the nodes 200, is coupled to the one or more other nodes 200 via a network 420 such as an internal LAN or the Internet. The master node 410 may be configured to execute an application that periodically checks a database (DB) 450 to determine if a new version of firmware is available. The database 450 includes, among other data, information related to the most recent version of the firmware that is available for a given test protocol for a particular electronic device represented by the one or more testbenches 250.

In operation, a designer or designers may utilize one or more computers 430 to generate new versions of the firmware, attempting to correct any bugs that are discovered via testing of older versions of the firmware by the system 400. The designer may also specify a test protocol including one or more tests to be performed on one or more testbenches 250 included in the nodes 200. Then, a designer may configure the application to check the database 450 periodically to determine whether a new build has been added to the database 450. In one embodiment, the application is configured to check the database 450 every day at a particular time to determine if a new build is available. In other embodiments, the application may be configured to check the database 450 every hour, 15 minutes, week, or whenever a node 200 is available to execute a test. In one embodiment, every time a node 200 finishes executing a test, results of the test are transmitted to the master node 410, and the master node 410 checks to determine whether a new build is available.

Once the designer has configured the application, the application is executed periodically by the master node 410. The designers may then continually generate new builds to be tested by the system 400. Once a build has been created, the build may be compiled to generate a binary file corresponding to the build and a record indicating the presence of the binary file is uploaded to the database 450. The next time the application is executed by the master node 410, the application will determine that a new build is available and copy the binary file to a local storage of the one or more nodes 200. In one embodiment, the master node 410 copies the binary file to each node 200. In another embodiment, the master node 410 copies the binary file to a subset of the nodes 200 and then each of the nodes 200 in the subset of nodes 200 having a locally stored copy of the binary file copies the binary file to other nodes 200 that do not include a copy of the binary file.

The master node 410 may also configure each of the nodes 200 to run a particular test of the test protocol specified by the designer. Multiple nodes 200 may perform the same test or each node 200 may perform different tests. Once the nodes 200 have performed one or more iterations of the tests, the nodes 200 may report the results of the tests to the master node 410. The results may include information about the test such as whether the test(s) passed or failed, a failure code associated with a failed test, a failure rate corresponding to a number of iterations of the tests, test logs, and the like. The master node 410 may collect results from one or more nodes 200 and store the results in the database 450. The master node 410 may also generate a visual representation of the results such as by generating a web page (e.g., a hyper-text markup language (HTML) document) that includes, graphs, charts, or logs that indicate the results of the tests performed by the nodes 200. The designer may access the web page using a web browser to view the results. In another embodiment, the nodes 200 may store results directly in the database 450. The designer may then access the results from the database manually, or through a front end such as a server that generates a web page using the results in the database 450 when the designer accesses the web page through a client such as a web browser.

In one embodiment, the master node 410 may determine whether a new build is available by querying the database 450 for any records associated with firmware corresponding to a particular electronic device. Each record in the database 450 may include information related to a firmware identifier, a version number, a timestamp, a CRC error-detecting code or hash value, a pointer to the location of a binary file corresponding to a particular build stored in a memory, and so forth. The records returned by the query may include any records associated with a particular firmware identifier. In other words, the firmware identifier may correspond to a particular electronic device the firmware is configured to support and, therefore, any records including the firmware identifier are associated with different versions of the firmware created for the same device. Each record may be further differentiated using the version number and/or a timestamp as well as zero or more other fields in the record. The master node 410 may then compare each of the timestamps and/or version identifiers with the timestamp and/or version identifier for the current build being tested by the nodes 200. If the timestamps and/or the version identifier indicate that a build associated with the record is newer than the current build being tested, then the master node 410 has identified a new build and the binary file corresponding to the new build is copied to each of the nodes 200 to perform the tests utilizing the new build. However, if none of the builds associated with the records are newer than the current build being tested, then the master node 410 causes one or more further iterations of the tests to be performed utilizing the current build being tested.

In another embodiment, the database 450 may be excluded from the system 400. Instead, the master node 410 is configured to check a particular location in a file system in order to determine if a new build is available. For example, the designer may configure the application executed by the master node 410 to associate a particular file folder in a file system attached to a server (not explicitly shown in FIG. 4) with a test protocol for the firmware. The master node 410 checks the file folder for any files at that particular location in the file system. For each file located in that file folder, the master node 410 may compare metadata associated with the file to determine whether the file corresponds to a new build. For example, the master node 410 may compare a time each file was last modified to a time associated with a binary file for the current build being tested to determine whether the file corresponds to a new build. In other embodiments, the master node 410 may analyze other metadata associated with the file, such as by parsing a filename, to determine whether the file corresponds to a new build.

Figure 5A:
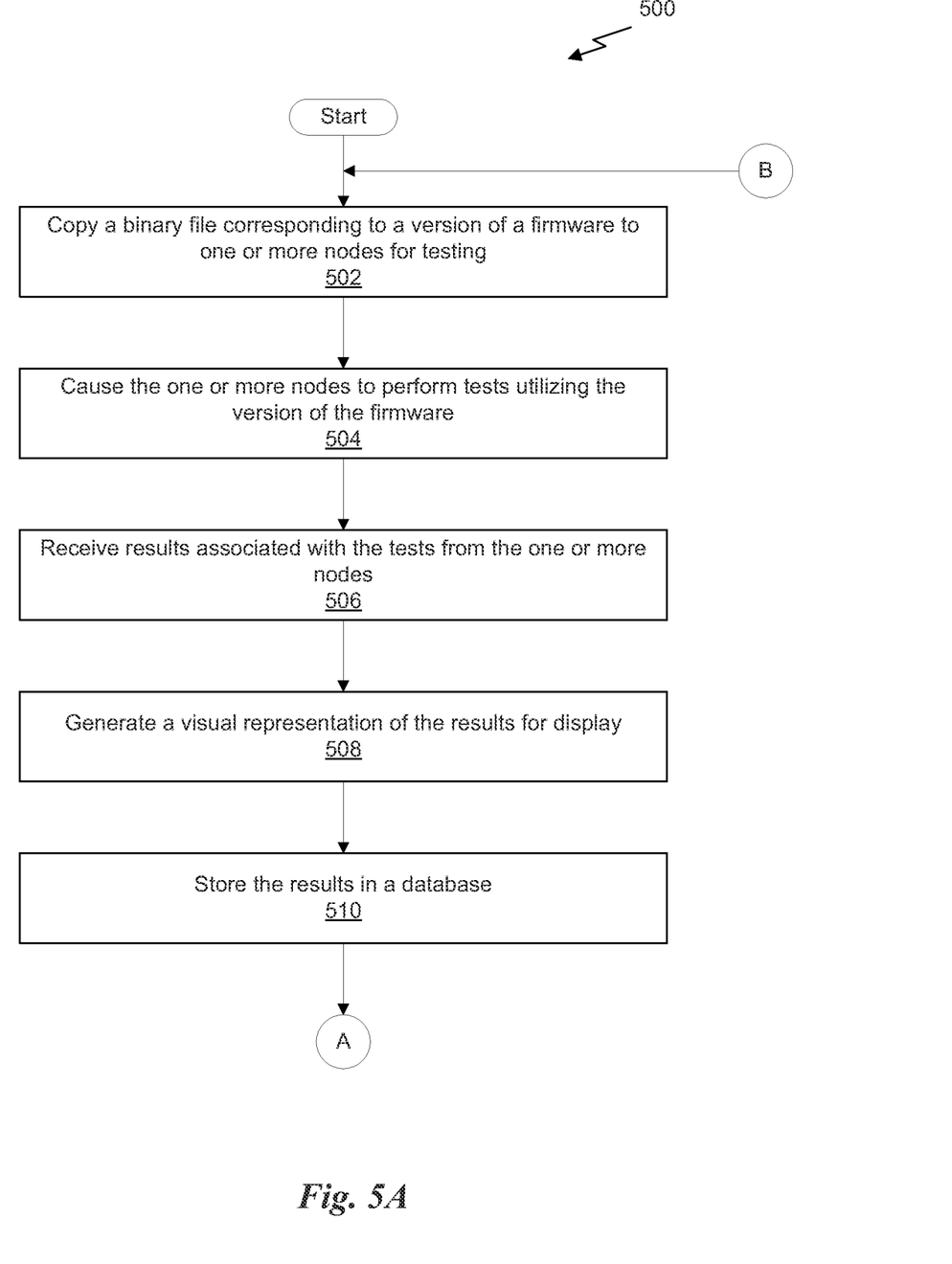
FIGS. 5A & 5B illustrate a flowchart of a method for automated stability testing of device firmware, in accordance with another embodiment.
Figure 5B:
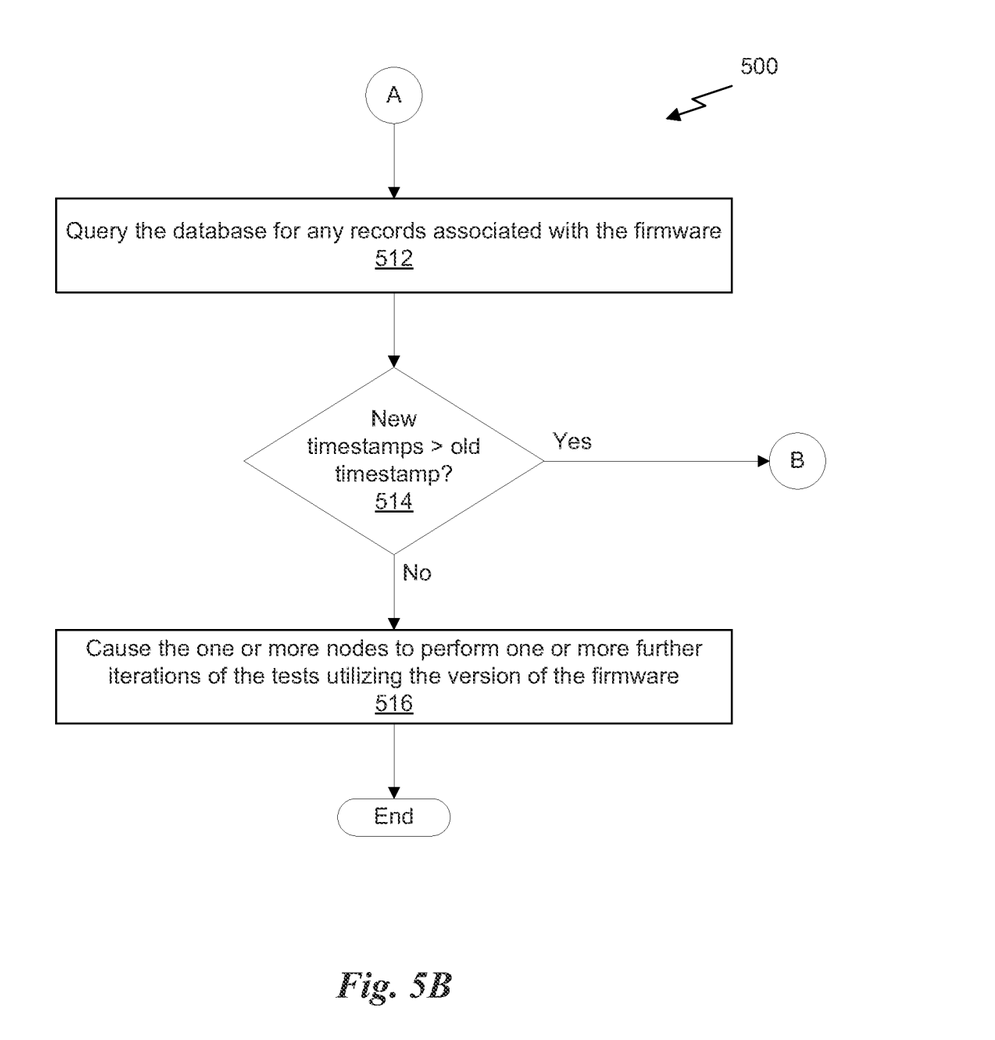

FIGS. 5A & 5B illustrate a flowchart of a method 500 for automated stability testing of device firmware, in accordance with another embodiment. At step 502, a master node 410 copies a binary file corresponding to a first version of the firmware to one or more nodes 200 for testing. At step 504, the master node 410 causes the one or more nodes 200 to perform tests utilizing the binary file. In one embodiment, the master node 410 is configured to transmit instructions to the nodes 200 that cause the nodes 200 to perform the tests utilizing the binary file. The tests may comprise an application program configured to be executed by the testbench 250 to generate results. The application program may be executed based on an instruction transmitted from the master node 410 to a machine 210 that causes the machine 210 to load the application program on the testbench 250 and execute the application program along with the version of the firmware corresponding to the binary file.

At step 506, the master node 410 receives results associated with the tests from the one or more nodes 200. The results may comprise information about the tests such as pass/fail, a failure rate, etc. At step 508, the master node 410 generates a visual representation of the results. In one embodiment, the visual representation of the results comprises a web page. The web page may be, e.g., HTML document, or other compatible format such as XML, for display on a web browser such as Microsoft® Internet Explorer, Mozilla® Firefox, or Google® Chrome. In some embodiments, step 508 is optional as a scripting language can generate the visual representation from the results when a designer makes a request to view the results. At step 510, the master node 410 may store the results in the database 450. In one embodiment, the master node 410 may store the results (i.e., raw data) in the database 450. Alternatively, the master node 410 may store the results in a memory associated with a server on the network 420 and store a pointer to the results in the database 450. In yet other embodiments, the master node 410 may store a pointer to the visual representation of the results in the database 450.

At step 512, the master node 410 queries the database for any records associated with the firmware. In one embodiment, the master node 410 may query the database to return any records associated with a particular firmware identifier corresponding to all versions of the firmware for a particular electronic device. At step 514, the master node 410 determines whether a new build is available by comparing timestamps included in each record returned by the query with a timestamp associated with a record for the current build being tested. If a new build is available (i.e., if a timestamp associated with one or more records is greater than a timestamp associated with a record for the current build being tested), then the method 500 returns to step 502 where a binary file corresponding to the new build is copied to the one or more nodes 200 and so forth. However, returning to step 514, if a new build is not available, then, at step 516, the master node 410 causes the one or more nodes 200 to perform another iteration of the tests utilizing the current build being tested.

Figure 6:
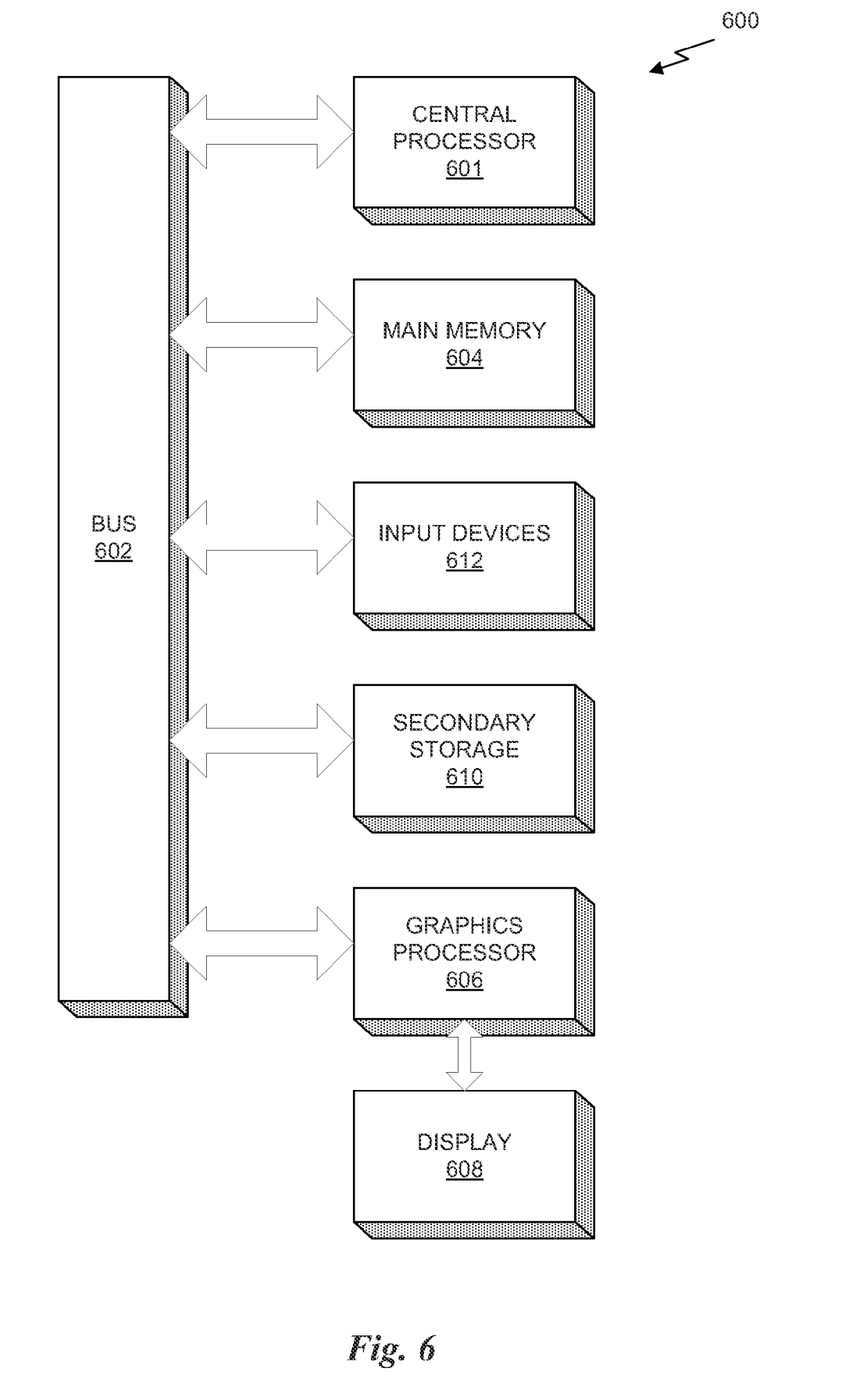
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU). In one embodiment, the system 600 may describe one or more of the master node 410, the nodes 200, and/or the computers 430.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    copying a binary file corresponding to a version of a firmware to one or more nodes that each include a testbench;
    causing the one or more nodes to perform tests utilizing the version of the firmware;
    determining whether a new build of the firmware is available, wherein determining whether a new build is available comprises:
        querying a database for any records associated with the firmware, and determining if any records returned by the query include a timestamp that is greater than a timestamp associated with a record for the version of the firmware, or
        searching a location in a file system to locate any files at the location, and determining if any of the located files are associated with metadata that indicates the located file corresponds to the new build; and
    if the new build is available, then copying a second binary file corresponding to the new build to the one or more nodes and causing the one or more nodes to perform the tests utilizing the new build, or
    if the new build is not available, then causing the one or more nodes to perform one or more further iterations of the tests utilizing the version of the firmware.

2. The method of claim 1, further comprising:
    receiving results associated with the tests; and
    generating a visual representation of the results for display.

3. The method of claim 2, further comprising storing the results in a database.

4. The method of claim 2, wherein the visual representation comprises a web page configured to be viewed using a web browser.

5. The method of claim 1, wherein each node of the one or more nodes comprises a machine coupled to the testbench.

6. The method of claim 1, wherein the testbench comprises a subset of hardware included in an electronic device that the firmware is configured to support.

7. The method of claim 1, wherein the testbench comprises a graphics processing unit.

8. The method of claim 1, wherein copying is performed by transferring binary files from a memory associated with a server connected to a network to a corresponding local memory associated with each of the one or more nodes.

9. The method of claim 8, wherein the network comprises a local area network.

10. The method of claim 8, wherein the network comprises the Internet.

11. The method of claim 1, wherein a designer generates a record in a database that indicates that the new build is available after the designer has compiled a source code for the new build to generate the second binary file and stored the second binary file in a memory.

12. The method of claim 11, wherein the record includes a pointer to the second binary file and a firmware identifier for the firmware.

13. A non-transitory computer-readable storage medium storing instructions that, when executed by a processor, causes the processor to perform steps comprising:
    copying a binary file corresponding to a version of a firmware to one or more nodes that each include a testbench;
    causing the one or more nodes to perform tests utilizing the version of the firmware;
    determining whether a new build of the firmware is available, wherein determining whether the new build is available comprises:
        querying a database for any records associated with the firmware, and determining if any records returned by the query include a timestamp that is greater than a timestamp associated with a record for the version of the firmware, or
        searching a location in a file system to locate any files at the location, and determining if any of the located files are associated with metadata that indicates the located file corresponds to the new build; and
    if the new build is available, then copying a second binary file corresponding to the new build to the one or more nodes and causing the one or more nodes to perform the tests utilizing the new build, or
    if the new build is not available, then causing the one or more nodes to perform one or more further iterations of the tests utilizing the version of the firmware.

14. The non-transitory computer-readable medium of claim 13, the steps further comprising:
    receiving results associated with the tests; and
    generating a visual representation of the results for display.

15. A system, comprising:
    one or more nodes coupled to a network, wherein each node in the one or more nodes includes a testbench; and
    a master node coupled to the network, the master node including a processor configured to:
        copy a binary file corresponding to a version of a firmware to one or more nodes that each include a testbench,
        cause the one or more nodes to perform tests utilizing the version of the firmware,
        determine whether a new build of the firmware is available by:
            querying a database for any records associated with the firmware, and determining if any records returned by the query include a timestamp that is greater than a timestamp associated with a record for the version of the firmware, or
            searching a location in a file system to locate any files at the location, and determining if any of the located files are associated with metadata that indicates the located file corresponds to the new build, and
        if the new build is available, then copy a second binary file corresponding to the new build to the one or more nodes and cause the one or more nodes to perform the tests utilizing the new build, or
        if the new build is not available, then cause the one or more nodes to perform one or more further iterations of the tests utilizing the version of the firmware.

16. The system of claim 15, further comprising a database configured to store records that indicate whether the new build is available.

17. The system of claim 15, wherein the testbench comprises a graphics processing unit.

* * * * *